United States Patent [19]
Suzuki

[11] Patent Number: 5,089,825
[45] Date of Patent: Feb. 18, 1992

[54] METHOD OF, AND APPARATUS FOR CONTROLLING AN ANTENNA DEVICE

[75] Inventor: Katsuo Suzuki, Tokyo, Japan

[73] Assignees: Kabushiki Kaisha Shinsangyokaihatsu, Tokyo, Japan; Aisin Seiki Kabushiki Kaisha, Kariya, Japan

[21] Appl. No.: 463,173

[22] Filed: Jan. 10, 1990

[30] Foreign Application Priority Data

Jan. 10, 1989 [JP] Japan ................... 1-002034

[51] Int. Cl.$^5$ ............................ G01S 5/02; G01S 3/56
[52] U.S. Cl. .................................. 342/425; 343/763
[58] Field of Search ............... 342/425, 78; 343/763, 343/765, 766

[56] References Cited

U.S. PATENT DOCUMENTS 4,150,379 4/1979 Connors.
4,827,265 5/1989 Das et al..

*Primary Examiner*—Theodore M. Blum
*Attorney, Agent, or Firm*—Sughrue, Mion, Zinn, Macpeak & Seas

[57] ABSTRACT

A method of, and apparatus for, controlling the directional aiming of an antenna device including: scanning the antenna along with a conical path and detecting a directional point at which a detected level of reception along the conical path is turned from increasing to decreasing; scanning the antenna along a directional path defined by a center point of the conical path and the directional point, and detecting a signal source point at which a detected level of reception along the directional path is turned from increasing to decreasing; and setting a directional aiming of the antenna at the detected signal source point.

7 Claims, 9 Drawing Sheets

D LIMITATION OF RECEIVING
d LIMITATION OF FOLLOWING

D LIMITATION OF RECEIVING
d LIMITATION OF FOLLOWING

METHOD OF, AND APPARATUS FOR CONTROLLING AN ANTENNA DEVICE

FIELD OF THE INVENTION

This invention relates to a method of, and apparatus for, controlling an antenna device, and more specifically relates to a method of, and apparatus for, controlling an antenna device mounted on a moving object.

BACKGROUND OF THE INVENTION

A moving object such as an automobile, a ship, an airplane, etc., has an antenna device to receive a television signal or a radio signal, or to receive signals from stations or satellites to detect its position while the moving object is moving. An electric wave used for this purpose is typically of relatively small power, so an antenna is required which provides a high gain and a high directivity. Therefore, a direction of an antenna device is controlled to face the electric wave source when the relative positions between the electric source and the antenna are changed due to a movement of the moving object. That is, the antenna device has to follow the direction of the electric wave in accordance with a change of positions between the antenna and the electric wave source.

In order to follow the electric wave source, an antenna device should be supported so that the antenna device can be moved throughout a range extending fully in the horizontal, and limited in the vertical directions (i.e., an electric wave source is not below the horizon). Also, in order to place an antenna in a correct direction, an antenna device should be controlled both in azimuth (Az) rotation and in elevation (El) rotation. The antenna device is driven by a motor (e.g., stepper motor) and a directional deviation is derived from the numbers of rotations of the motor.

In order to follow the electric wave, a certain level of reception is required. Before the directional aiming of an antenna device can be controlled automatically, the direction of the antenna device has to be placed in the area where the required minimum level of reception can be obtained. Such initial directional aiming can be effected by an automatic searching or by a manual operation.

FIG. 6 shows a concept of this searching by a manual operation of the antenna device. In FIG. 6, an x axis shows an azimuth direction Az and a y axis shows an elevation direction El, the origin of both axes shows a home position of the antenna device and the point O shows the coordinates of the electric wave source position. The outer circle D shows a limitation of reception. The antenna can not receive the signals outside of the circle D, and thus cannot follow the signals outside the same. The inner circle d sets a safer area of reception in which the antenna device can follow even if the direction of the antenna is not faced to the wave source perfectly. Thus, the antenna should be placed in the circle d in order to start following the signals.

In order to place the antenna in the circle d automatically, the antenna scans in the elevation El direction starting from the home position and the antenna is moved one step (i.e. 0.5 deg.) in the azimuth Az direction between each upward or downward scan of the antenna in the elevation EL direction. This positive and negative El direction and 0.5 degree Az movement scan is continued until the azimuth Az reaches 360 degrees, and all the while, the level of the reception is being detected. If the coordinates of the wave source is known to be away from the home position and if an operator knows a rough position of the signal source (e.g., 270 degrees), the initial directional aiming of the antenna can be conducted more quickly if the antenna is allowed to scan after the operator first moves the antenna to the azimuth 270 degrees. Further, if the operator knows the exact position of the signal source, the operator can place the antenna toward the signal direction even more quickly.

FIG. 7 is a flow chart showing the above-mentioned scanning operations. Referring to FIG. 7, when the power is turned on, in step 1 the system is initialized such that the control circuit is reset and the direction of the antenna is set at the home position. In step 2, the system waits for a ready condition. If the system is ready, the system waits for next instruction in step 3. If the start key 16 (FIG. 2, described ahead) is on, the system goes to step 5 and scans the wave signal automatically. If the start key 16 is not on, an operator can control the antenna direction by a manual operation in a step 4. When the scanning is done in step 5, the system goes to step 6 and starts following the signal. In step 7, the system watches (i.e., monitors) the stop key 17. If the stop key 17 is on, the system stops controlling. If the stop key is not on, the system continues with a repeat of the steps 5 and 6.

There are two major ways to follow the signal, with the first being called continuous lobbing and the second being called simultaneous lobbing. Because a simultaneous lobbing operation requires a big diameter antenna, it is not practical to utilize the same with the type of antenna on an automobile or smaller moving object, except a big moving object such as a ship.

The continuous lobbing way is divided into two different types, with the first type being called a step tracking operation and the second being called a conical scan operation. A conical scan operation, including a beam changing operation, loses a part of a gain and its received signal is modified into an amplitude modulation, so the conical scan operation cannot be used for reception.

FIG. 8 shows a concept of the step tracking operation. Referring to FIG. 8, an x axis shows an azimuth Az and a y axis shows an elevation El. The coordinates of the signal source is at the origin O, and the coordinates of the antenna is at the point a when the following starts. It is noted that the level of the reception is decreased when the antenna moves away from the coordinate O (the coordinates of the signal source). Such step tracking operation proceeds according to the following steps:

1) The system moves the antenna one azimuth step (i.e., 0.5 deg.) to the right (from point a to point b) and compares between the levels of the receptions of both positions. If the comparison indicates an increase of the reception signal, the system sets a next azimuth step in the same direction. If not, the system changes a next azimuth step in the opposite direction. In FIG. 8, the system keeps same direction in a next azimuth step.

2) The system moves the antenna one elevation step up (from point b to point c) and compares between the levels of the receptions of both positions. If the comparison indicates an increase of the reception signal, the system sets a next elevation step in the same direction. If not, the system changes a next elevation step in the opposite direction. In FIG. 8, the system keeps same direction in a next elevation step.

3) In accordance with the result of control 1), the system moves the antenna one azimuth step to the right (from point c to point d). In this case, the comparison indicates that the signal decreases. So the system changes a next azimuth step to the left.

4) In accordance with the results of control 2), the system moves the antenna one elevation up (from point d to point e). In this movement the comparison indicates that the signal increases. Then the system keeps the next elevation step in the same direction.

The system continues in an operation analogous to the above steps so that the antenna can follow the wave signal.

However with the above-described step tracking operation, a trace of the scanning is relatively long because a determination of the steps is somewhat of a trial and error system, and there is a delay to follow the signals. Accordingly, as the step tracking operation depends on a time period between the step movements to keep a directivity of the antenna within a certain area, there is a high chance that a direction of the antenna will go out of the valid reception area. Further, as step movements are continued even when a direction of the antenna is within the valid reception area, the antenna continues to move and stop during the reception. This gives a disadvantageous load to the antenna mechanism. These drawbacks are caused because the above-described step tracking operation is not directly detecting the coordinates of the signal, but only following the signal step by step in a certain period time.

SUMMARY OF THE INVENTION

An object of the present invention is to provide a method of, and apparatus for, controlling an antenna device which avoids the above-mentioned drawbacks, and is especially directed to provide a method of, and apparatus for, controlling an antenna device by detecting the coordinates of the directions of the signal.

Other objects will be apparent from an understanding of the invention.

In accordance with this invention, a method for controlling an antenna device comprises the following steps:

a step for scanning the antenna and detecting a level of a reception signal;

a step for comparing the detected level of the reception signal with a predetermined lowest level and if said detected level is greater than the predetermined level, going back to the first step, and if not, setting that point as a center point and going to a next step;

a step for scanning the antenna along a conical path having the center which is found by the previous step and a predetermined angle and detecting levels of the receptions;

a step for detecting a point at which the detected level of the reception is turned from increasing to decreasing;

a step for scanning the antenna along a linear path between the point and the center of the conical and detecting levels of the receptions;

a step for detecting a point that the detected level of the reception is turned from increasing into decreasing; and a step for setting the antenna at the detected point.

The operation in accordance with this invention will be explained with reference to FIG. 4. In FIG. 4, the x axis shows an azimuth direction Az and y axis shows an elevation direction El. The signal source is at the origin O, the outer circle D indicates the limitation of the reception area, and the inner circle d indicates the limitation of the following area. The level of the reception on the border of the inner circle d is taken to be a level SL. When the scanning is done, the coordinates of the antenna direction is located somewhere in the circle d. If the relative positions between the signal source and the antenna direction are changed, the coordinates of the antenna direction might cross beyond the border of the circle d. This can be detected by comparing a level of the reception with the limitation level SL. This crossing point is shown as point a in FIG. 4. When such a level SL crossing point is detected, the system executes the following steps;

1) The system moves the antenna in the azimuth direction by a length of r (from point a to point b). The length r should be set shorter than the radii of the circles D and d.

2) The system scans the antenna along a conical having a center a and the radius r, toward the clockwise direction starting from the point b. The system detects levels of the reception continuously and finds a point c where the reception level is changed from increasing into decreasing, when compared with the previous level. Then the system stops scanning.

3) The system scans the antenna along with the line between the point a and the point c from the point c. The system detects levels of the reception continuously and finds the point O where the reception level is changed from increasing into decreasing, when compared with the previous level, and takes such point as the point where the signal source is located. Then the system stops scanning.

If the radius of the inner circle d is set to be half the radius of the outer circle D, a point c and a point O are identical in the scanning of step 2). Therefore step 3) can be eliminated, but it is more frequent that the antenna direction goes out of the inner circle d.

The settings of the azimuth to the right in step 1) and clockwise direction in step 2) do not always give the shortest tracking of the antenna scanning. Accordingly, the setting of the azimuth to the right/left direction and the clockwise/counter-clockwise scanning could be changed in accordance with the level changing of the reception so that a tracking of the antenna scanning would be the shortest.

BRIEF DESCRIPTION OF THE DRAWINGS

The objects and advantages of the invention will become apparent from the following detailed description of preferred embodiments thereof in connection with the accompanying drawings in which.

DETAILED DESCRIPTION OF THE PREFERRED EMBODIMENT

Figure 1:
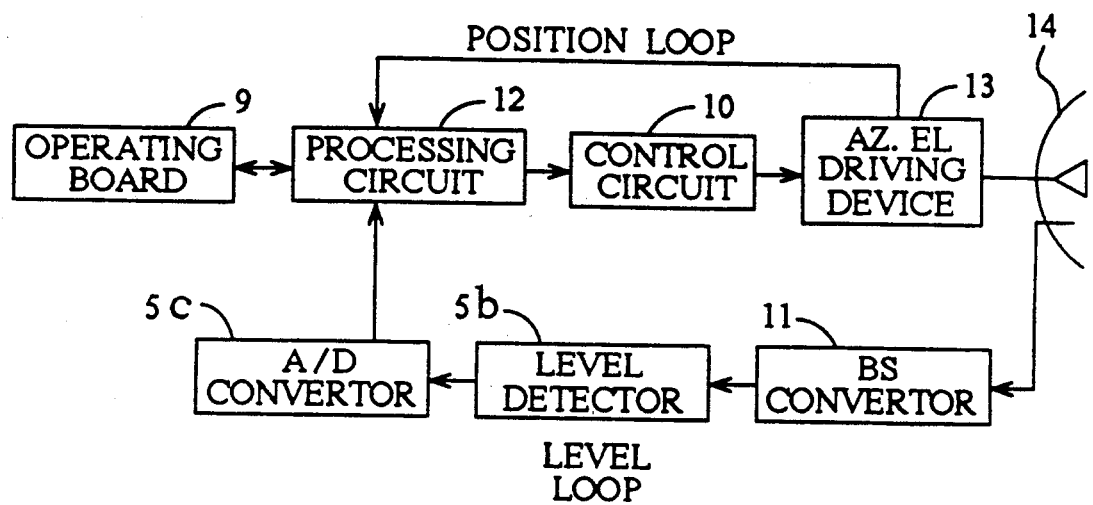
FIG. 1 is a block diagram showing a system for controlling an antenna device in accordance with the present invention.

Referring to FIG. 1, an antenna 14 is supported by an azimuth Az and elevation El driving device 13 and can be moved in the horizontal and vertical directions. An amount of the antenna movement is detected by reading the number of rotations of a motor in the driving device 13. A reading signal is fed back to a processing circuit 12 by a position loop. A level of a reception of the antenna 14 is fed back to the processing circuit 12 through a level loop such as a BS convertor 11, a level detecting circuit 5b and an A/D convertor 5c. An instruction from the processing circuit 12 is sent to the driving device 13 through a control circuit 10 to control the direction of the antenna 14. An operation (i.e.. control) board 9 is connected to the processing circuit 12.

Figure 2:
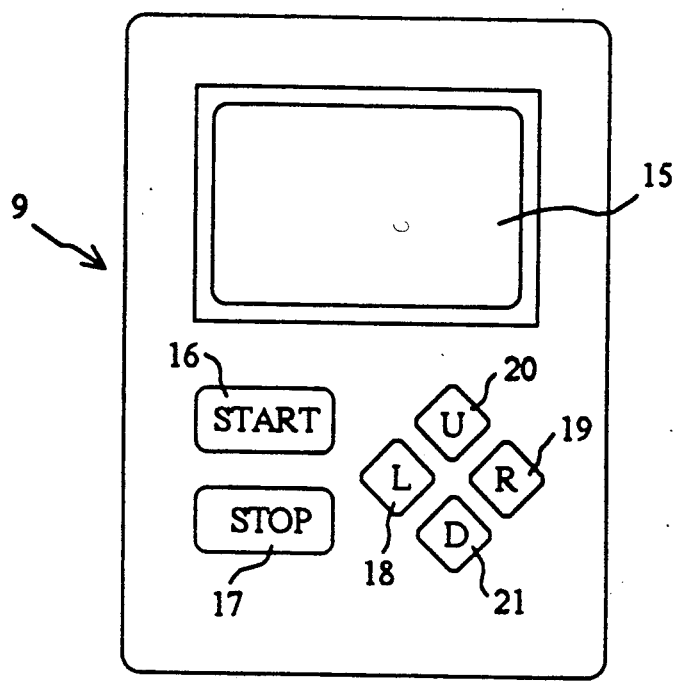
FIG. 2 is a plan view of the operating (i.e., control) board 9 of FIG. 1.

FIG. 2 shows the operation board 9. Referring to FIG. 2 a CRT display 15 shows values of an azimuth Az and an elevation El and a level of the reception, etc. The board 9 provides a start key 16, a stop key 17, keys for manually controlling the antenna direction such as a left key 18, a right key 19, an up key 20 and a down key 21. These keys enable a manual antenna control operation such as that described with respect to a step 54.

Figure 3:
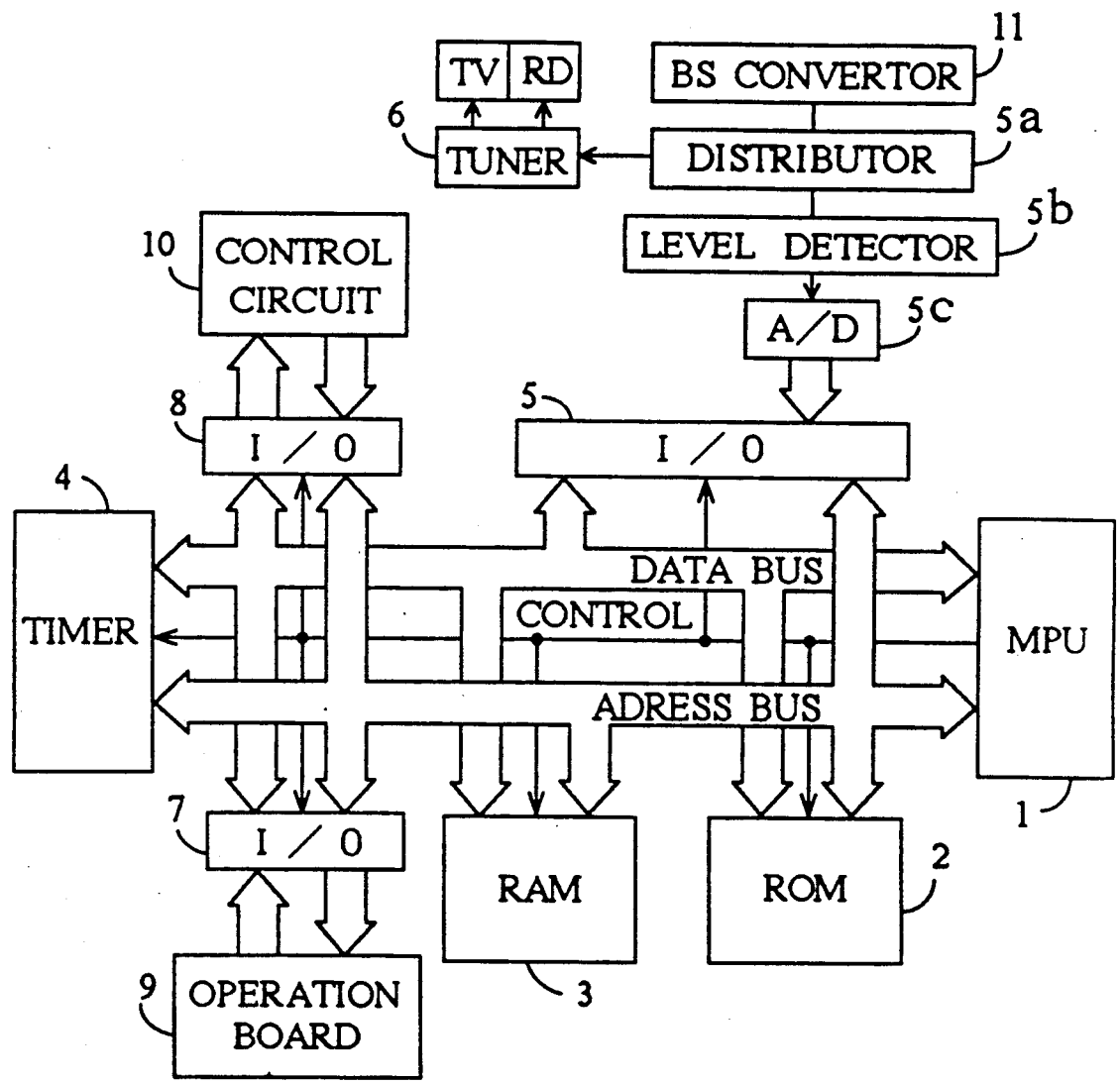
FIG. 3 is a circuit diagram of the processing circuit 12 of FIG. 1.
Figure 3:
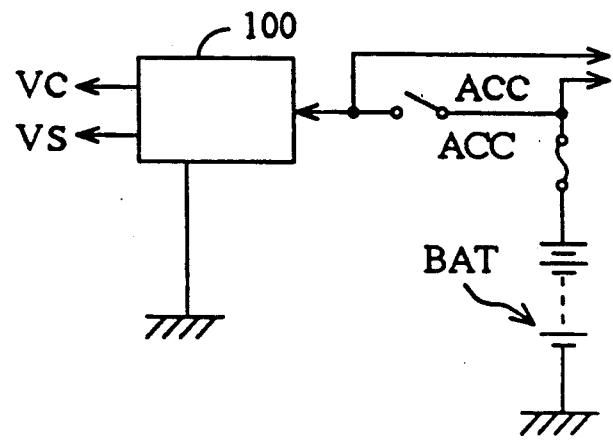
Figure 4:
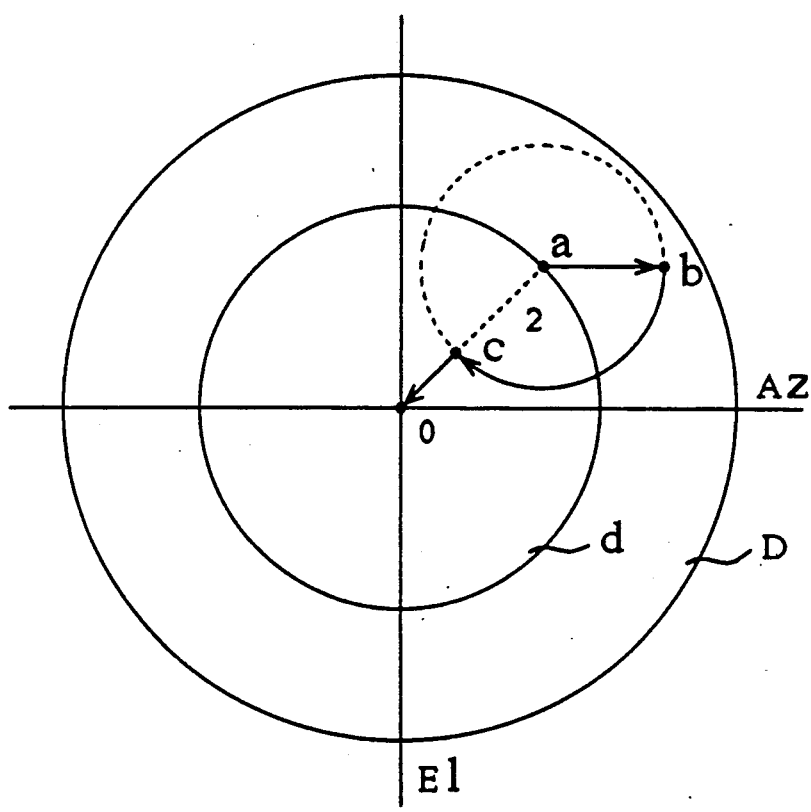
FIG. 4 is a drawing showing the principal of the following signal of the present invention.

FIG. 3 is a block diagram of the processing circuit 12 in FIG. 1. This system comprises a microprocessor unit MPU 1. Bus lines of the MPU 1 are connected to ROM 2. RAM 3, a timer 4 and I/O ports 5, 6, 7 and 8. The timer 4 generates a delay signal continuously which is used as a time reference for detecting a level of a reception signal. I/O 5 is connected to a level detecting unit and comprises the BS convertor 11, a distributor 5a, a level detector 5b and A/D convertor 5c. The distributor 5a distributes a signal to a television receiver through a BS tuner 6. I/O 7 is connected to the operation board 9, and I/O 8 is connected to the control circuit 10. Component 100 and the circuitry associated therewith in a bottom portion of FIG. 3 are for the purpose of supplying suitable voltage source levels Vc and Vs.

Figure 5A:
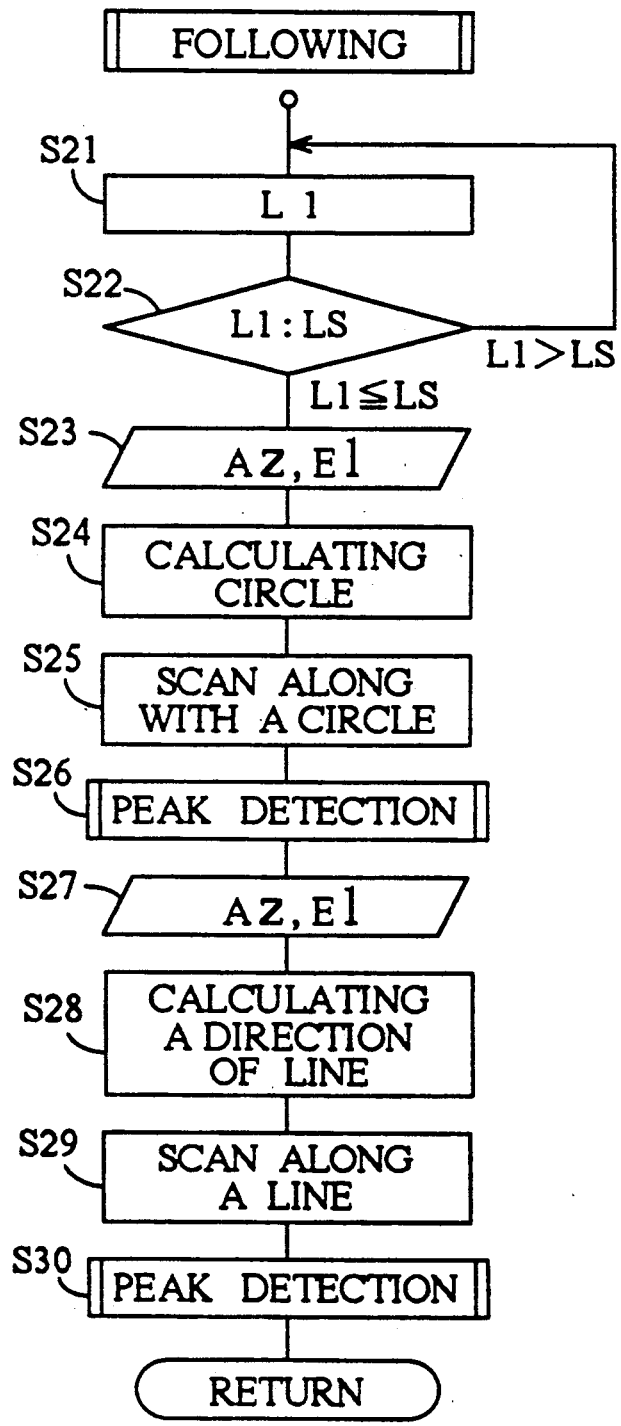
FIG. 5a is a flow chart showing an operation of the system of FIG. 1.
Figure 7:
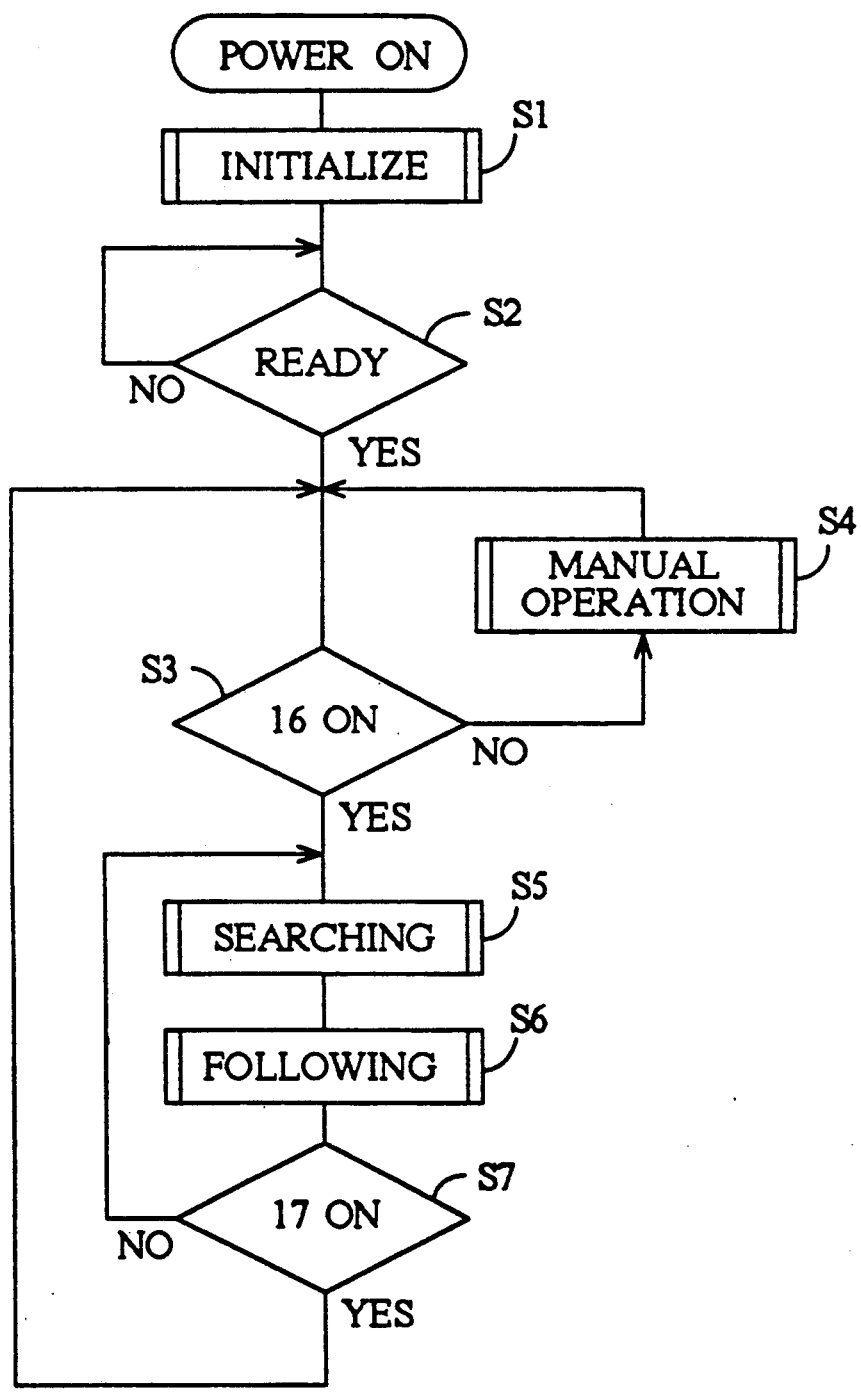
FIG. 7 is a flow chart showing an operation of a control for antenna direction.
Figure 8:
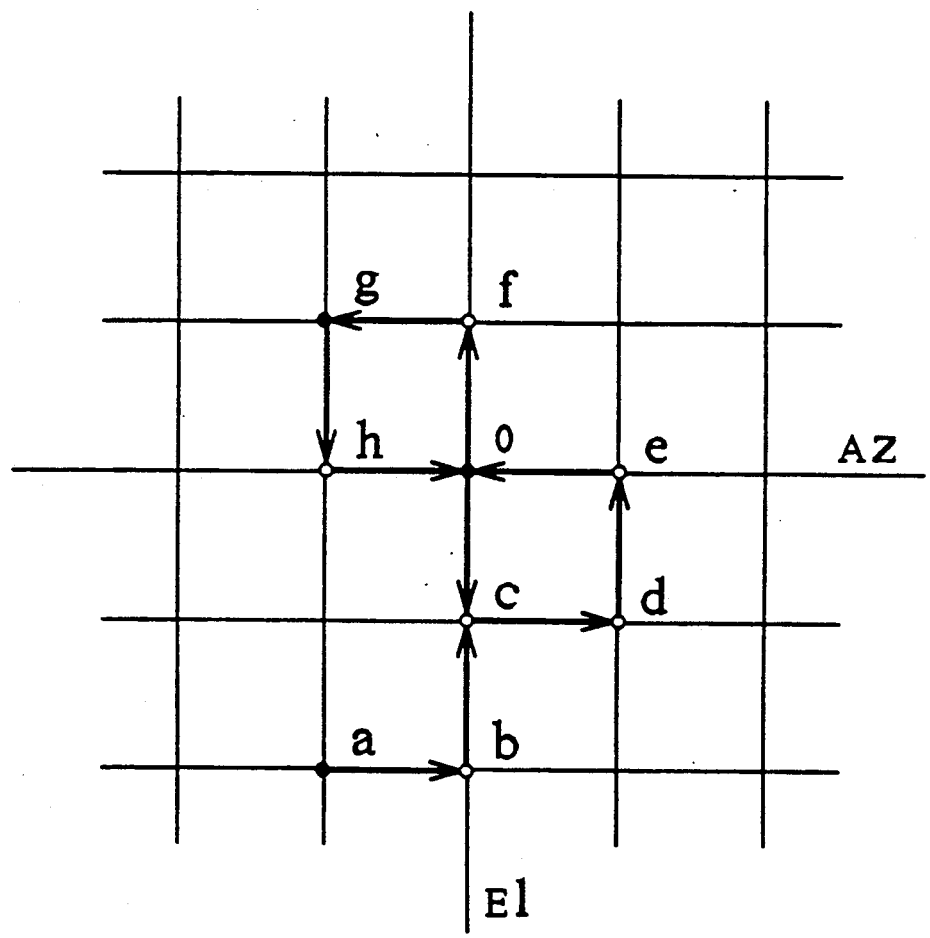
FIG. 8 is a drawing showing a concept of a step tracking operation.

FIG. 5a is a flow chart showing an operation of the system. FIG. 5a shows only a part of the control for following a signal which is shown in FIG. 7. Referring to FIG. 5a, in step 21, a reception level L1 of the antenna is read. The reception level L1 is compared with a predetermined limit reception level LS in step 22. If L1 is greater than LS, the system makes a decision that a direction of the antenna is within the valid reception area and goes back to step 21 and continues these steps at every period as set by the timer 4. If L1 is equal or smaller than LS, the system makes a decision that a direction of the antenna is on or out of the border of the limitation of the reception area. In step 23, the system writes the present antenna directional coordinates in RAM 3. The system calculates a circular trace around the coordinates in a step 24 and scans the circular trace in step 25. The system keeps detecting a reception level during the circular trace scanning. The system detects the point C at which a reception level changes from an increasing to a decreasing level. The coordinates of point C are input to RAM 3 in step 27. In step 28, the system calculates a direction by using the coordinates a, the coordinates C and a formula stored in ROM 2. This direction decides a direction along which to conduct a linear scanning operation, and the system executes the linear scanning in step 29.

Figure 5B:
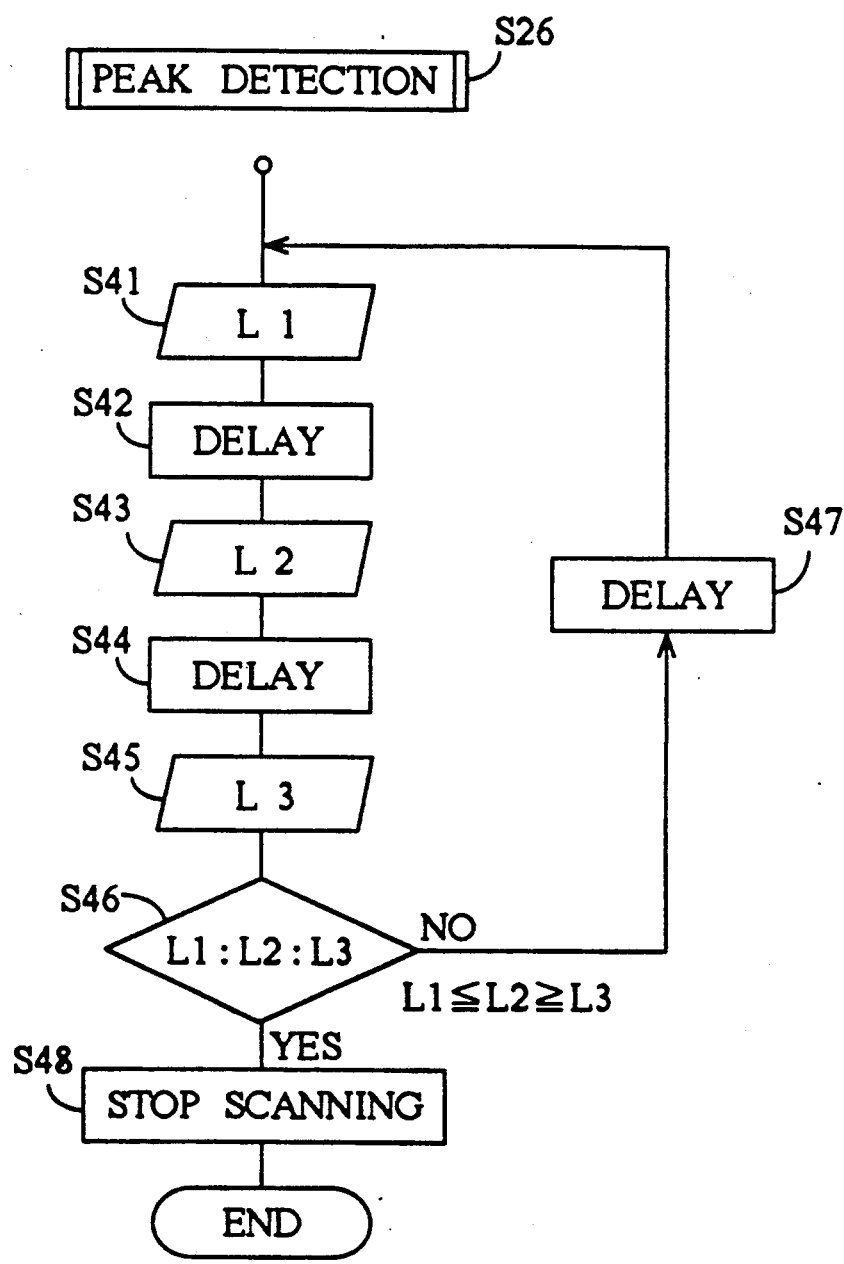
FIGS. 5b and 5c are sub-routine flow charts showing the operations of steps 26 and 30 in FIG. 3, respectively.

FIG. 5b is a sub-routine showing the step 26 of FIG. 5a. The timer 4 provides delays in steps 42 and 44, and the reception levels L1, L2 and L3 are stored in RAM 3 in steps 41, 43 and 45. In step 46, the system compares the levels L1, L2 and L3. If $L1 \leq L2 \geq L3$ the system makes a decision that the reception level is changing from increasing to decreasing and stops the circle scanning in step 48. If not, the system goes back to step 41 through the delay step 47.

Figure 5C:
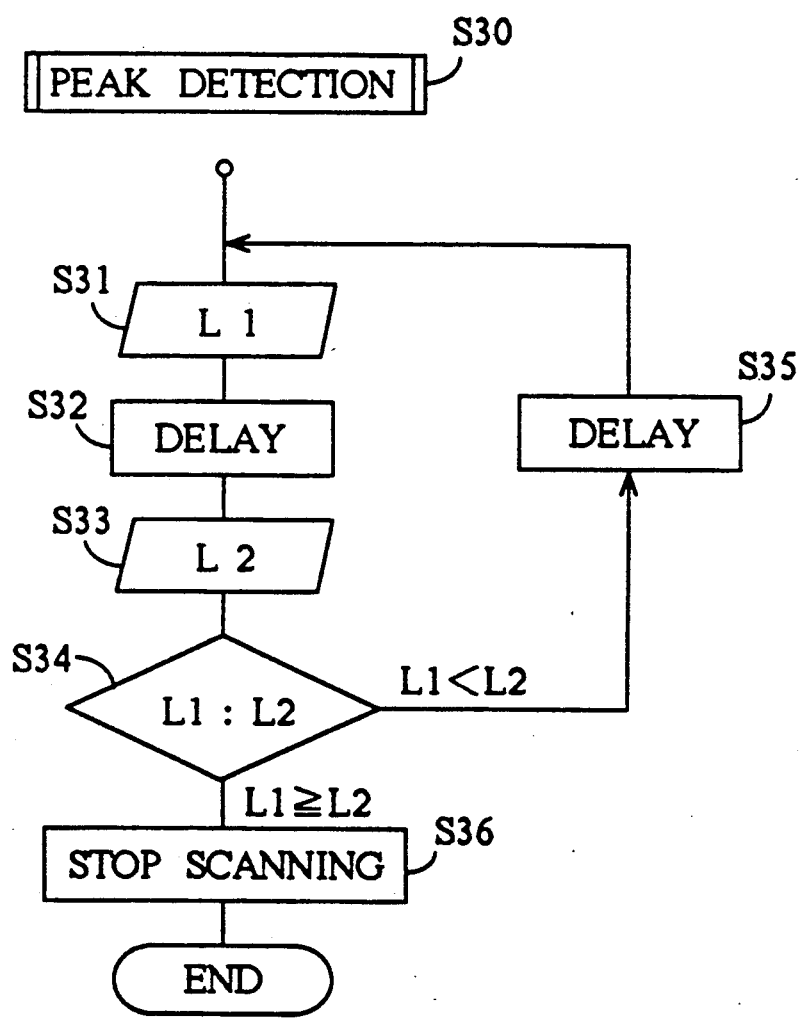
Figure 6:
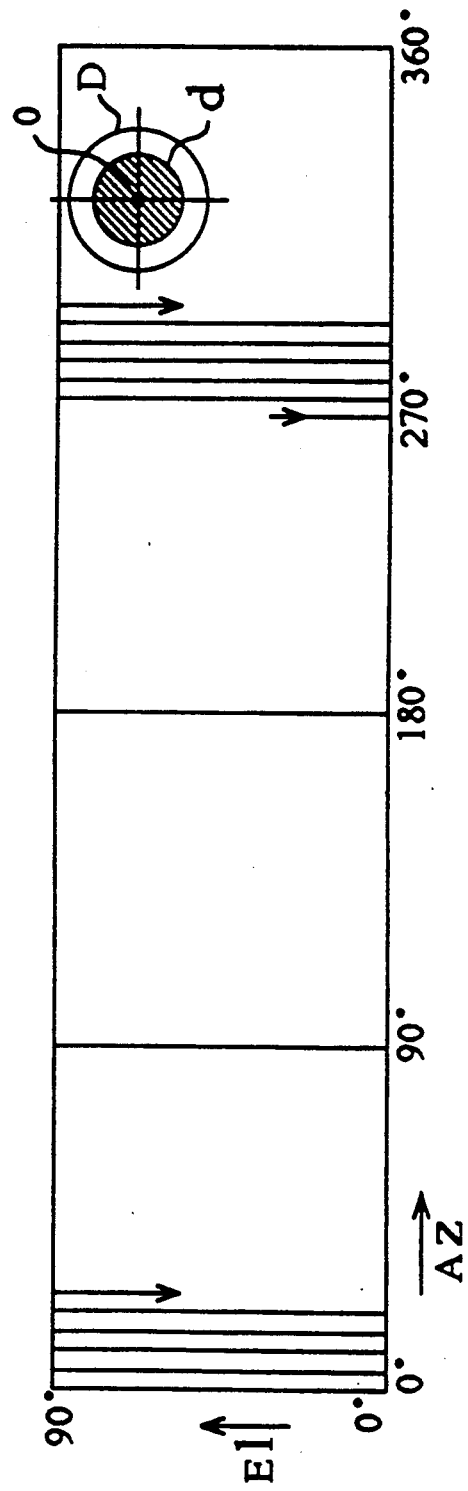
FIG. 6 is a drawing showing a method for setting the antenna direction in a certain area.

FIG. 5c is a sub-routine showing the step 30 of FIG. 5a. In this scanning, the reception level is increasing when the scanning starts therefore, it is enough to detect a point at which the reception level is turned into decreasing level. In step 31, the level L1 is stored in RAM 3. After the delay provided by the timer 4 in step 32, the level L2 is stored in RAM 3. Then, the system compares the levels L1 and L2 in step 34. If $L1 \geq L2$ the system detects a decreasing of levels, and the system stops the scanning in step 36. If not, the system goes back to step 31 through the delay provided in step 35. It is noted that if $L1 \geq L2$ is found, that indicates the point of signal source has been encountered.

In accordance with the above-mentioned invention, because the system scans according to a circular scanning operation to find a direction of the signal source and then scans according to a linear scanning operation along the direction found by the circular scanning, the scanning traces are reduced and performed more quickly than the aforementioned tracking operations.

The system compares the reception levels with the limitation level of the area continuously, thereby substantially to reduce the chance that the antenna aiming will fall out of the valid reception range. Such makes signal source tracking more reliable.

Finally as the system executes scanning only when the reception level reaches the limitation, the antenna is controlled effectively and unnecessary tracking movement within the area is eliminated.

Although the invention has been described in connection with preferred embodiments thereof, it will be appreciated by those skilled in the art that additions, substitutions, modifications and deletions not specifically described, may be made without departing from the spirit and scope of the invention as defined in the appended claims.

What is claimed is:

1. A method of controlling an antenna device comprising the steps of:
    scanning said antenna device along a conical path and detecting a directional point at which a detected level of reception along the conical path is turned from increasing to decreasing;
    scanning said antenna along a straight linear directional path defined by a center point of said conical path and said direction point, and detecting a signal source point at which a detected level of reception along the straight linear directional path is turned from increasing to decreasing; and
    setting a directional aiming of said antenna device at said detected signal source point.

2. A method as claimed in claim 1, wherein said step of detecting a directional point along said conical path comprises the steps of:

detecting at least first and second reception levels at separated first and second points along said conical path respectively; and determining said directional point when said second reception level is less than said first reception level.

3. A method as claimed in claim 2, wherein said step of detecting a signal source point along the straight linear directional path comprises the steps of:

detecting at least first and second signal reception levels at separated first and second points along said straight linear directional path, respectively; and detecting said signal source point when said second signal reception level is less than said first signal reception level.

4. An apparatus for controlling an antenna device comprising:

means for scanning said antenna device along a conical path and detecting a directional point at which a detected level of reception along the conical path is turned from increasing to decreasing;

means for scanning said antenna along a straight linear directional path defined by a center point of said conical path and said direction point, and detecting a signal source point at which a detected level of reception along the straight linear directional path is turned from increasing to decreasing; and means for setting a directional aiming of said antenna device at said detected signal source point.

5. An apparatus as claimed in claim 4, wherein said means for detecting a directional point along said conical path comprises:

means for detecting at least first and second reception levels at separated first and second points along said conical path, respectively; and means for determining said directional point when said second reception level is less than said first reception level.

6. An apparatus as claimed in claim 5, wherein said means for detecting a signal source point along the straight linear directional path comprises:

means for detecting at least first and second signal reception levels at separated first and second points along said straight linear directional path, respectively; and means for detecting said signal source point when said second signal reception level is less than said first signal reception level.

7. A method of controlling an antenna device comprising the steps of:

detecting a level of a reception signal of said antenna device;

comparing said detected level of the reception signal with a predetermined reception limitation level, and if said detected level is greater than the predetermined level, repeating a previous said detecting step, and if not, setting a present directional aiming of said antenna device as a center point and going to a next step;

scanning said antenna device along a conical path having a center which is found by the previous step and a predetermined angle, and detecting levels of the receptions along said conical path;

detecting a point at which said detected level of the reception along said conical path is turned from increasing into decreasing, and setting the same as a directional point;

scanning said antenna device along a straight linear path defined by said center point and said directional point, and detecting levels of the receptions along said straight linear path;

detecting a point at which said detected level of the reception along said straight linear path is turned from increasing into decreasing, and setting the same as a detected signal source point; and setting a directional aiming of said antenna device at said detected signal source point.

* * * * *